United States Patent
David (10) Patent No.: US 9,946,575 B2
(45) Date of Patent: Apr. 17, 2018

(54) METHOD OF EXECUTION OF TASKS IN A CRITICAL REAL-TIME SYSTEM

(71) Applicant: KRONO-SAFE, Orsay (FR)

(72) Inventor: Vincent David, Marcoussis (FR)

(73) Assignee: KRONO-SAFE, Orsay (FR)

( * ) Notice: Subject to any disclaimer, the term of this patent is extended or adjusted under 35 U.S.C. 154(b) by 24 days.

(21) Appl. No.: 14/783,246

(22) PCT Filed: Mar. 17, 2014

(86) PCT No.: PCT/FR2014/050612
§ 371 (c)(1),
(2) Date: Oct. 8, 2015

(87) PCT Pub. No.: WO2014/167197
PCT Pub. Date: Oct. 16, 2014

(65) Prior Publication Data
US 2016/0070600 A1    Mar. 10, 2016

(30) Foreign Application Priority Data
Apr. 9, 2013 (FR) ...................................... 13 53203

(51) Int. Cl.
*G06F 9/46* (2006.01)
*G06F 9/50* (2006.01)
*G06F 9/48* (2006.01)
*G06F 9/52* (2006.01)

(52) U.S. Cl.
CPC .......... *G06F 9/5038* (2013.01); *G06F 9/4887* (2013.01); *G06F 9/52* (2013.01)

(58) Field of Classification Search
None
See application file for complete search history.

(56) References Cited

U.S. PATENT DOCUMENTS

2007/0021998 A1* 1/2007 Laithwaite ............. G06Q 10/06
705/7.13
2009/0327610 A1* 12/2009 David ................... G06F 9/3851
711/119
2010/0281241 A1* 11/2010 El-Nakhily ........ G06Q 10/0633
712/234

OTHER PUBLICATIONS

Iain Bate; Worst-Case Execution Time Analysis for Dynamic Branch Predictors; 2004 IEEE.*

(Continued)

*Primary Examiner* — Dong Kim
(74) *Attorney, Agent, or Firm* — Oliff PLC (57) ABSTRACT

Method for executing a task composed of a set of sequential and alternative processes. The method includes the steps of: a) assigning to each process a hardware resource need and time constraint; b) allocating to each process a time-slot having a duration corresponding to the time constraint of the process; c) identifying a branch point at which is decided the execution of one or other of two alternative processes; d) allocating to the two alternative processes a common time-slot; e) assigning to the common time-slot a resource need equal to the larger of the resource needs of the two alternative processes; f) iterating from step c) for each branch point; g) organizing the resulting time-slots in an execution template associated with the task; and h) configuring real-time multitasking system to constrain the execution of the task according to the resource needs assigned to the time slots of the execution template.

12 Claims, 5 Drawing Sheets

(56) References Cited

OTHER PUBLICATIONS

Reinhard Wilheml; The worst-case execution time problem; ACM; Apr. 2008.*
Wilhelm, Reinhard, et al. "The Worst-Case Execution-Time Problem? Overview of Methods and Survey of Tools". ACM Transactions on Embedded Computing Systems, ACM, New York, NY, US, vol. 7, No. 3, Apr. 1, 2008 (Apr. 1, 2008), pp. 36-53, XP002538651, ISSN: 1539-9087.
Colin, Antoine, et al. "Worst Case Execution Time Analysis for a Processor With Branch Prediction". Real Time Systems, Kluwer Academic Publishers, Dordrecht, NL, vol. 18, No. 2/03, May 1, 2000 (May 1, 2000), pp. 249-274, XP001096704, ISSN: 0922-6443.
Bougeroua, Lamine, et al. "Execution Overrun Management for Fixed-Priority Preemptive Scheduling of Sporadic Graph Tasks". Emerging Technologies and Factory Automation, 2006, ETFA, '06, Sep. 1, 2006 (Sep. 1, 2006), pp. 413-420, XP031082614, ISBN: 978-0-7803-9758-3.
Albers, Karsten, et al. "Hierarchical Event Streams and Event Dependency Graphs: A New Computational Model for Embedded Real-Time Systems". Real-Time Systems, 2006. 18th Euromicro Conference on Dresden, Germany, Jul. 5-7, 2006, Piscataway, NJ, USA, Jul. 5, 2006 (Jul. 5, 2006), pp. 97-106, XP010927454, ISBN: 978-0-7695-2619-5.
Anantaraman, Aravindh, et al. "Enforcing Safety of Real-Time Schedules on Contemporary Processors Using a Virtual Simple Architecture (VISA)". Real-Time Systems Symposium, 2004, Proceedings, 25th International, Lisbon, Portugal, Dec. 5-8, 2004, Piscataway, NJ, USA, Dec. 5, 2004 (Dec. 5, 2004), pp. 114-125, XP010759529, ISBN: 978-0-7695-2247-0.
Anantaraman, Aravindh, et al. "Virtual Simple Architecture (VISA): Exceeding the Complexity Limit in Safe Real-Time Systems". Proceedings of the 30th International Symposium on Computer Architecture, ISCA 2003, San Diego, CA, Jun. 9-11, 2003, pp. 350-361, XP010796942, ISBN: 978-0-7695-1945-6.
Nov. 25, 2014 International Search Report issued in International Patent Application No. PCT/FR2014/050612.
Oct. 13, 2015 International Preliminary Report on Patentability issued in International Patent Application No. PCT/FR2014/050612.

* cited by examiner

METHOD OF EXECUTION OF TASKS IN A CRITICAL REAL-TIME SYSTEM

FIELD

The invention relates to critical real-time systems designed to execute processes with mandatory timelines set by a time base. The invention relates in particular to real-time systems requiring a high level of performance in their implementation, and to critical systems where a high level of security is required in the use of hardware execution resources allocated to each task in the system.

The invention applies in particular to process control systems such as those used in the fields of transport (automobile, railway, naval, aerospace), industrial automation, energy, and other systems for which controlled resource allocation is important, as in communications networks.

BACKGROUND

In critical real-time systems, tasks are often modeled as periodic activities, leading to the realization of multitasking systems based on a fixed priorities policy for task scheduling, providing guarantees on performance achievement. Such a system is described, for example, in the article ["Scheduling algorithms for Multiprogramming in a hard real-time environment", C. Liu, J. Layland, Journal of the ACM, vol. 20, no. 1, pp. 46-61].

However, this approach lacks flexibility when the very simple model of periodic tasks complexifies or constrains the design of the multitasking system by an arbitrary division into periodic tasks of certain real-time activities that are not periodic a priori. Indeed, when a non-periodic real-time activity is implemented in the form of periodic activities, this leads to increasing the number of tasks or increasing the execution pace to meet the time constraints separately. Each task may then no longer be useful to each periodic execution, which negatively impacts the performance of the multitasking system.

Other approaches, such as those described in the articles ["Giotto: A Time-Triggered Language for Embedded Programming", Thomas A. Henzinger, Benjamin Horowitz, and Christoph Meyer Kirsch, EMSOFT 2001, pp. 166-184, 2001, Springer-Verlag] and ["A method and a technique to model and ensure timeliness in safety critical real-time systems", C. Aussaguès, V. David, Fourth IEEE International Conference on Engineering of Complex Computer Systems, 1998] propose more flexible task models to describe each task as sequences of temporal activities. A task is then formalized in the form of a graph of processes with time constraints, where the processes may, if required, be conditional, as proposed in U.S. Pat. No. 7,299,383.

It is then possible to achieve a high flexibility and a high level of performance of the multitasking system, and even a faunal guarantee that tasks can be scheduled, but this guarantee generally requires dynamic scheduling in the system. This results in temporal interference between the tasks in that the tasks, or the tasks' processes compete for scheduling, and that a task can thus be executed before or after a concurrent task.

In critical systems, where safety of the execution is paramount, dynamic scheduling systems are avoided, because it is not possible to exhaustively test all possible -scheduling combinations or to prove the absence of failure situations. Systems with reduced combinations to test are then preferred, thus systems limiting temporal interference between tasks. This typically leads to using static approaches that lack flexibility.

SUMMARY

There is a need for configuring real-time systems based on flexible task models, but offering implementations that limit temporal interferences.

The invention relates to a method for executing a task composed of a set of sequential and alternative processes. The method comprises the steps of:
  a) assigning to each process a hardware resource need and a time constraint;
  b) allocating to each process a time slot having a duration corresponding to the time constraint of the process;
  c) identifying a branch point at which is decided the execution of one or the other of two alternative processes;
  d) allocating to the two alternative processes a common time slot;
  e) assigning to the common time slot a resource need equal to the larger of the resource needs of the two alternative processes;
  f) iterating from step c) for each branch point;
  g) organizing the resulting time slots in an execution template associated with the task; and
  h) configuring a real-time multitasking system to constrain the execution of the task according to the resource needs assigned to the time slots of the execution template.

The method may comprise the steps of representing the task in the form of a graph defining a set of processes connected by transition nodes, wherein each transition node defines a synchronization point according to a time base during execution of the task on the multitasking system; defining the limits of the time slot allocated to each process from a source transition node and a destination transition node of the process; for two alternative processes that have a common source node and two respective target nodes, merging the two target nodes into a merged target node; and defining the time slot common to both alternative processes from the common source node and the merged target node.

The method may comprise, for two alternative processes having in step c) different time constraints, the steps of creating an intermediate transition node in a first of the two alternative processes having the longest time constraint, resulting in a first partial alternative process between the source node and the intermediate node, and a second partial process between the intermediate node and the target node of the first alternative process; assigning to the first partial alternative process a first resource need and a time constraint equal to the time constraint of the second alternative process; assigning to the second partial process a second resource need such that the sum of the first and second resource needs is equal to the resource need of the first alternative process, and a time constraint equal to the difference of the time constraints of the two alternative processes; and proceeding with the first partial alternative process and the second alternative process according to step d).

The method may comprise the steps of, in each time slot, checking by a watchdog that the execution of an ongoing process complies with the resource need assigned to the time slot; and omit signaling a fault by the watchdog if the execution of the ongoing process exceeds the resource need and the ongoing process is the first partial alternative process.

The method may comprise the steps of setting a state variable upon execution of the first partial alternative process; omit signaling a fault by the watchdog if the execution of the ongoing process exceeds the resource need and the state variable is set; and clearing the state variable at a synchronization point corresponding to a merged target node.

The method may comprise, for a cyclic portion of the graph, the steps of dividing each process having a longer time constraint in a set of partial processes having a shorter time constraint that is the greatest common divisor of the time constraints in the cyclic portion, whereby the cyclic portion of the graph is transformed into a normalized sub-graph defining a sequence of full or partial processes all having the same normalized time constraint; and distributing the resource need of each process having a longer time constraint between the corresponding partial processes, whereby the sum of the resource needs of the partial processes is equal to the resource need of the process having the longer time constraint.

The method may comprise the steps of overlapping the end of a first portion of the sub-graph over the beginning of a second portion of the sub-graph, so that the transition nodes of the end of the first portion of the sub-graph coincide with respective nodes of the beginning of the second portion of the sub-graph, whereby two consecutive pairs of coincident nodes define a time slot common to the processes having as respective origins the two nodes of the first pair; and assigning to the common time slot thus defined a resource need equal to the greatest of the resource needs of the processes associated with the first pair of nodes, and a time constraint equal to the normalized time constraint.

BRIEF DESCRIPTION OF DRAWINGS

Other advantages and features will become more clearly apparent from the following description of particular embodiments of the invention provided for exemplary purposes only and represented in the appended drawings, in which.

DESCRIPTION OF EMBODIMENTS

Figure 1:
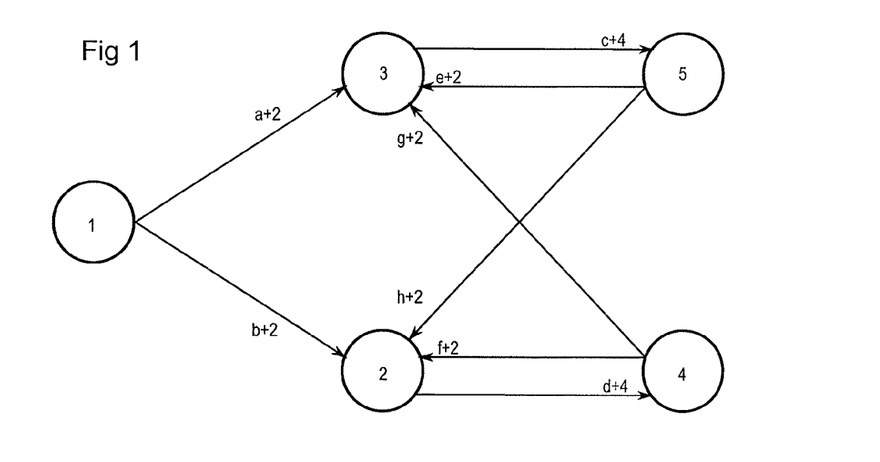
FIG. 1 is an example of a real-time task graph conforming to a flexible task model, having branch alternatives with identical time constraints.

FIG. 1 is an exemplary real-time task graph conforming to a flexible task model. In this graph, as in the other graphs set forth below, each process composing the task is represented by an oriented arc between two transition nodes, a source node and a target node. The nodes are synchronization points used by the operating system, during the execution of the task, to organize process launching. Each process is assigned a time constraint identifying the duration between corresponding synchronization points.

In addition, for a process to be executed within the limits of its time constraint, it also has a physical resource need (CPU occupation, memory footprint).

Each arc (or process) of the graph is annotated with information x+N, where x is a resource need indicator and N a time constraint indicator. The resource need x may be expressed as a time, namely the time required for the process to complete assuming that it has all the hardware resources. The time constraint may be an integer defining units of time. Thus, expressing x and N in the same unit of time, the values x and N are chosen such that x≤N. If x=N, the process requires all hardware resources throughout the time slot defined by the time constraint, so that no other process can be executed in parallel in the same slot. (The calculation of the resource needs and the time constraints is not a subject of the present disclosure, and will not be described in detail.)

Hereinafter, the letter used for designating the resource need also identifies a process.

The graph, or task is said to be according to a "flexible model" in that it includes arbitrarily organized branches and loops. Because each branch is determined dynamically at runtime, and in an unpredictable manner, the execution sequence of the processes is generally aperiodic. The consequences will be understood hereinafter.

Figure 2A:
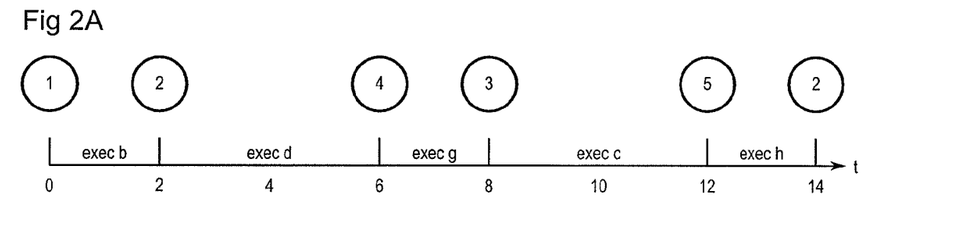
FIGS. 2A and 2B show a partial execution trace of one of the possible processing sequences of the graph of FIG. 1, and an execution trace of a parallel task.

FIG. 2A shows an exemplary execution trace of the graph of FIG. 1. The nodes crossed during the execution are shown on a time axis at steps defined by the time constraints of the processes. Thus, the nodes are positioned at fixed synchronization points where the operating system launches the corresponding processes.

Each process may take a variable time according to its need and the actually available resources. The operating system also executes a watchdog process that is configured to count the time spent in execution by each process. If a process exceeds the temporal need assigned to it, the watchdog signals an anomaly. The temporal need may thus be considered as an execution time quota.

The execution of the task of the graph of FIG. 1 begins at node 1, where a first branch between two alternative processes a and b takes place. The process b is selected for execution, leading to the node 2. A process d is executed between the nodes 2 and 4. At node 4 a new branch takes place between a process f and a process g; process g is selected for execution, leading to the node 3. A process c is executed between the nodes 3 and 5. At node 5 a new branch takes place between a process e and a process h; process h is selected for execution, leading to node 2 . . .

In general, the resource needs set for the processes may be significantly smaller than the time constraints, meaning that the task execution leaves resources available to perform other tasks in parallel.

Figure 2B:
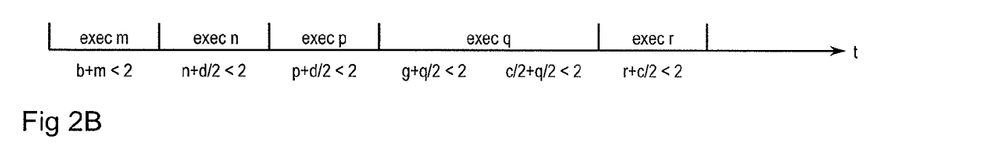

FIG. 2B shows an execution trace of a task executed in parallel with the task of FIG. 2A. This parallel task includes a sequence of processes m, n, p, q and r, having resource needs defined with the same labels. To facilitate understanding, this task is shown with synchronization points aligned with those of the task of FIG. 2A, however with variations in the temporal constraints. For this task to be scheduled in parallel with the task of FIG. 2A, it is desirable, in any interval between synchronization points, that the sum of the resource needs of the processes be compatible with the time constraints. A possible set of inequalities to be met for the example is illustrated under the time axis.

Thus, scheduling two tasks in parallel involves the knowledge of the sequence of processes to derive the necessary parameters. If this sequence can be determined offline, the scheduling can also be done offline, that is to say, statically. When a task conforms to a flexible model, i.e. when it includes branches in particular, it is generally not possible to know the sequence offline. Scheduling is then traditionally achieved dynamically, that is to say, at runtime, when the branch conditions can be identified.

In a critical real-time system, it is moreover desired to verify that the system is safe for any possible scheduling combination. This is traditionally achieved by testing all combinations. When scheduling is achieved dynamically, the number of combinations to test may be prohibitive in practice.

A methodology is disclosed herein for performing a static, or offline scheduling of tasks conforming to a flexible model. This methodology aims at limiting the number of scheduling combinations, so that they can be verified exhaustively using conventional tools. It is sought to establish for each task a so-called static "execution template", which is exploitable by an offline-scheduling tool.

For this purpose, a single time slot is assigned in the execution template to the two alternative processes that may follow a branch. The resource need assigned to the single slot is defined as equal to the greater resource need of the two alternative processes. The time constraint assigned to the slot, that is to say, the boundaries of the slot remain to be defined.

In a first approach, the situation where the alternative processes have the same temporal constraint will be addressed. In a more general case, as discussed further below, a transformation can be found for turning an arbitrary situation into a situation where the two alternative processes have the same time constraint.

In the graph of FIG. 1, the alternative processes following each branch (nodes 1, 4 and 5) happen to have the same time constraints.

Figure 3A:
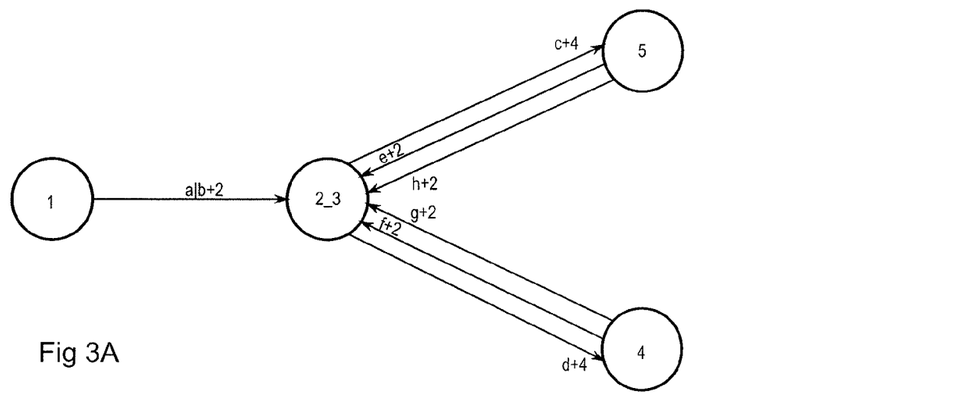
FIGS. 3A to 3C show transformations of the graph of FIG. 1 and a resulting static execution template.

FIG. 3A illustrates a first step in transforming the graph of the FIG. 1. The two target nodes 2 and 3 of the two alternative processes a and b are merged into a single node 2_3. The arcs that connected the nodes 2 and 3 to the nodes 4 and 5 are all connected to node 2_3. The two arcs that went from the node 1 to nodes 2 and 3 are merged into a single arc. This unique arc is associated with an "ambivalent" process representing any of the processes a and b, and is noted a|b+2. As indicated by this notation, the common time constraint (+2) of the processes a and b is the time constraint of the ambivalent process. The resource need of the ambivalent process is defined as equal to the maximum value, max(a,b), of the resource needs of processes a and b.

It can be noted that the processes c and d, which were not branch alternatives, become alternatives originating at merged node 2_3. It can also be noted that alternatives f, g and e, h going from each of the nodes 4 and 5 to the nodes 2 and 3 are grouped together due to the fact that the nodes 2 and 3 are merged. A this stage, these alternatives could have been represented by a single arc, like arc a|b+2.

Figure 3B:
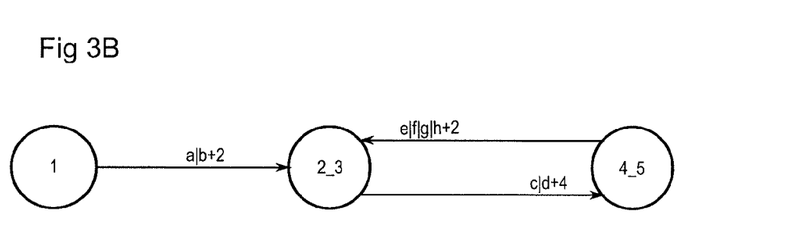

FIG. 3B illustrates a final step of transformation of the graph of FIG. 1. The target nodes 4 and 5 of the alternative processes c and d are merged into a node 4_5. There are two processes c and d having the same time constraint (+4) going from the node 2_3 to the node 4_5, and four processes e, f, g, and h having the same time constraint (+2) going in the opposite direction. According to the rules applied to the alternative processes a and b, all the arcs from the same source node to the same target node and having the same time constraint, are merged into a single arc assigned to an ambivalent process that keeps the time constraint, and whose resource need is set equal to the largest of the resource needs of the arcs that are merged. A single ambivalent process c|d+4 from the node 2_3 to the node 4_5, having a resource need max(c,d), and a single ambivalent process e|f|g|h+2 in the opposite direction, having a resource need max (e,f,g,h) are thus obtained. It is thus possible to remove all the alternatives in a graph to produce a graph having a linear path terminated by a cyclic portion to execute in a loop.

Figure 3C:
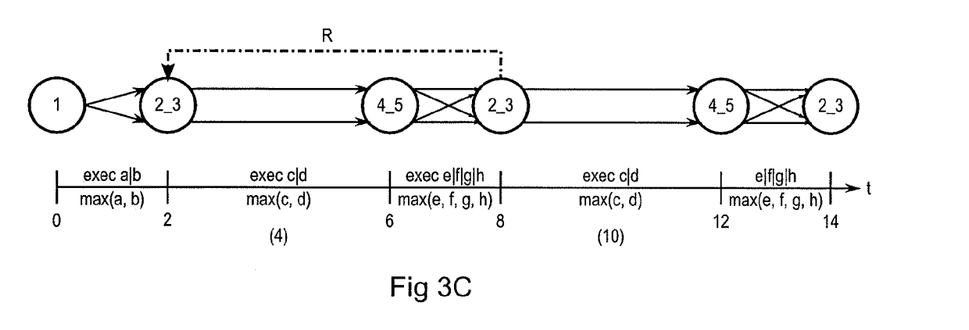

FIG. 3C illustrates an execution template determined from the transformed graph of FIG. 3B, in the same format as the execution trace of FIG. 2A. A significant difference between the template and the trace is that the template can be determined offline using the transformed graph of FIG. 3B.

At a time t=0, the execution of one of the alternative processes a and b is decided at node 1. Whatever the alternative, it is executed in the single slot defined between nodes 1 and 2_3, the duration of which is compatible with both alternatives. Thus an arbitrary one of the processes c and d is executed in the next slot defined between nodes 2_3 and 4_5. Finally, one of the processes e, f, g, and h is executed in the slot defined between nodes 4_5 and 2_3. The execution then resumes in a new cycle R from the node 2_3.

The resource needs assigned to the slots between the nodes 1, 2_3, 4_5 and 2_3 are respectively max(a,b), max (c,d) and max(e,f,g,h).

This execution template may be an intermediate product of a compilation toolchain that processes source code defining the graph of the task. The template provides parameters that allow the operating system to run the task and check its safe operation, in particular the resource needs assigned to the time slots, which needs may be used for configuring a watchdog that ensures that the corresponding processes are completed on time.

It shall be noted that this methodology does not affect the execution of the task, but modifies the execution constraints of the processes, because the watchdog is configured to account for maximized resource needs instead of exact resource needs.

The template moreover allows to predict at any time how the task evolves in terms of its resource needs and time constraints. Indeed, the cyclic portion R of the template of FIG. 3C can be repeated at will from the first node 2 of FIG. 2A to predict the resource needs and time constraints at any point of the execution trace, whatever alternatives are executed after the branches. The only downside is that the resource need values are maximized instead of being exact.

A similar template is produced for each task to run on the system. The durations of the time slots and the corresponding resource needs defined in these templates are usable by an offline scheduling tool that can produce static scheduling parameters for the operating system.

Figure 4:
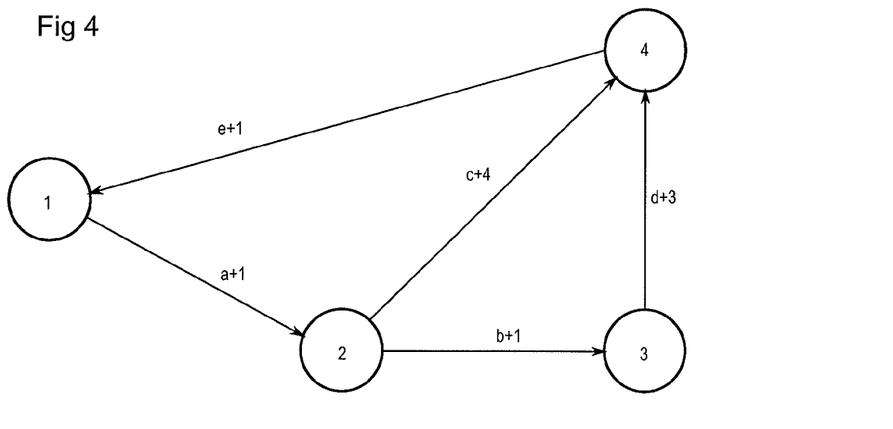
FIG. 4 is an example of real-time task graph conforming to a flexible task model having branch alternatives with different time constraints.

FIG. 4 is an exemplary graph including alternative processes having different time constraints, which corresponds to a more general situation than that of the graph of FIG. 1. Execution begins at node 1 with a process that leads to a node 2. At node 2 a branch takes place between a process b of time constraint +1, or a process c of time constraint +4. The process b leads to a node 3, while the process c leads to a node 4. A process d, of time constraint +3 goes from node 3 to node 4. Finally, a process e goes from node 4 to node 1.

Figure 5A:
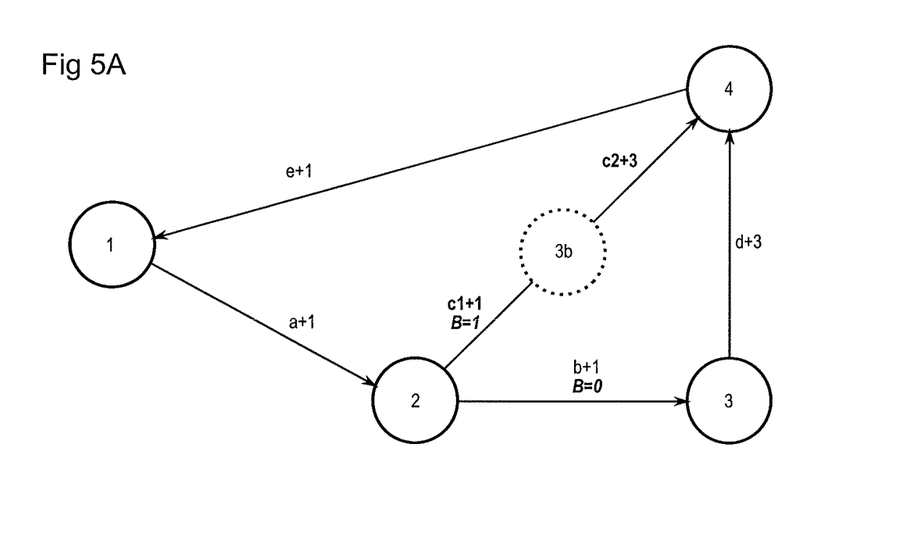
FIGS. 5A to 5C show transformations of the graph of FIG. 4 for a first alternative of time constraints, and a resulting static execution template.
Figure 5B:
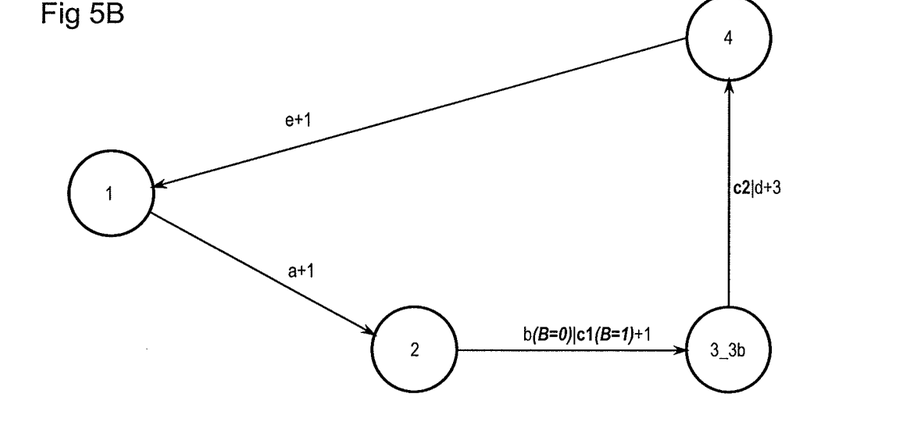
Figure 5C:
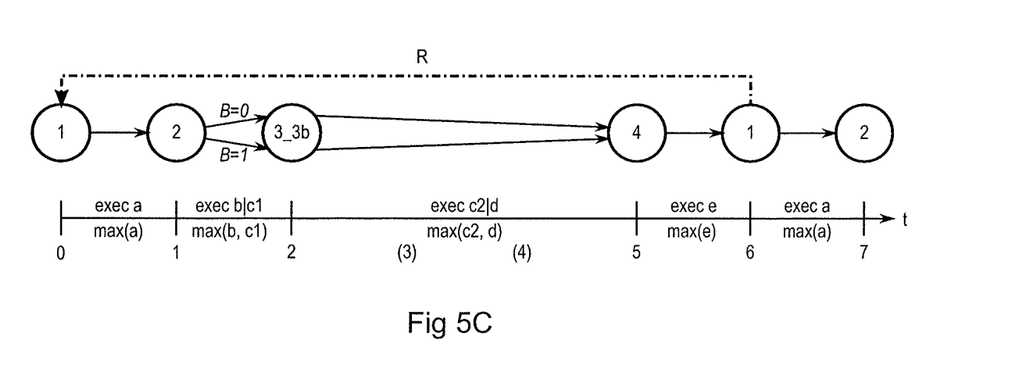

It is sought to modify this graph so that it can be transformed like the graph of FIG. 1 to define a static execution template. FIGS. 5A to 5C illustrate a methodology for this.

FIG. 5A illustrates a first transformation step of the graph of FIG. 4. In the alternative process having the longest time constraint, process c, an intermediate node 3*b* is inserted. It is considered that the arc connecting the nodes 2 and 3*b* represents a part c1 of the process c, and it is assigned the same time constraint +1 as the alternative process b. The arc connecting the nodes 3*b* and 4 represents the remaining part c2 of the process c, and it is assigned the complement +3 of the time constraint of process c. The resource needs of the partial processes c1 and c2 are such that c1+c2=c. The distribution of the resource need c between the needs c1 and c2 may be arbitrary. This distribution may be optimized, for example, in order to minimize the deviations between the resource needs of the alternative processes and their maximized value. For example, if c=2, b=0.8, and d=1, the values c1=0.9 and c2=1.1 produce a maximum deviation of 0.1.

It may be noted here that the fact of adding a resource need (c1) corresponds to adding an execution constraint to monitor by the watchdog, constraint that is not required a priori. If no particular measure is taken, the watchdog will check from point 2 that the execution of partial process c1 meets the resource need c1, whereas the initial constraint is that the execution of the process c meets the resource need c.

A first approach to satisfy these constraints is that the developer or toolchain is responsible for splitting the process c into adapted partial processes c1 and c2. This allows using the existing operating system unmodified, in return of modified execution characteristics of the task.

A preferred approach involves a simple modification of the operating system. As illustrated in FIG. 5A, the two alternative processes of the branch of node 2 are assigned a state variable or flag B to identify the alternative taken at runtime. When the executed alternative corresponds to the unmodified arc (b), the flag B remains at its default cleared value (e.g. 0). When the alternative corresponds to the modified arc (c1), the flag B is set by the process itself or by the operating system. The use of this flag will be described in more detail in connection with FIG. 5C.

FIG. 5B illustrates a final transformation of the graph of FIG. 5A. Thanks to the insertion of the node 3*b*, creating two alternative processes with the same time constraint, the target nodes 3 and 3*b* of these alternative processes could be merged according to the methodology described in relation to FIG. 3A. This creates an ambivalent process b|c1 between the node 2 and the merged node 3_3*b*, with the time constraint +1 and the resource need max(b,c1).

Using the flag B, the ambivalent process is denoted b(B=0)|c1(B=1).

The processes d and c2 that went from nodes 3 and 3*b* to node 4, having the same time constraint +3, can be merged into a single ambivalent process c2|d with the time constraint +3 and the resource need max(c2,d).

FIG. 5C illustrates an execution template determined from the transformed graph of FIG. 5B. This template is repeatable according to the sequence of nodes 1, 2, 3_3*b*, 4.

If the flag B is not used, and the partial process c1 is executed in its corresponding slot, a watchdog checks from point 2 that the process c1 complies with its resource need c1. This involves that the partial process c1 is designed to meet this constraint, although it is not mandatory at the origin.

The flag B is used to disable the watchdog in this situation, so that constraints for such partial processes can be relaxed.

If the alternative process b is executed, the flag B remains at its original cleared state. This signals to the watchdog that it should monitor the execution of the process normally.

If the alternative partial process c1 is executed, the flag B is set (by the process itself or by the operating system). In this case, even if the resource need c1 is exceeded, the watchdog reports no fault. The flag B is cleared at point 3_3*b*, so that the watchdog operates normally from point 3_3*b* on.

By thus using the flag B, it becomes unnecessary to actually split the process c into two partial processes. The original process c may be launched at point 2, and its execution can last beyond point 3_3*b* without a fault being signaled. Only if the execution of process c exceeds the resource need c1+c2 will a fault be signaled, which corresponds to the constraints of the original graph. For the purpose of scheduling, it is still considered that the resource need of process c is distributed over two values c1 and c2.

As noted above, after inserting the intermediate node 3*b*, the processes c2 and d have the same time constraint. These values were chosen to simplify the explanations. In the general case, the time constraints will be different. In this case, it is sufficient to repeat the technique used for the process c, as shown by way of example below.

Figure 6A:
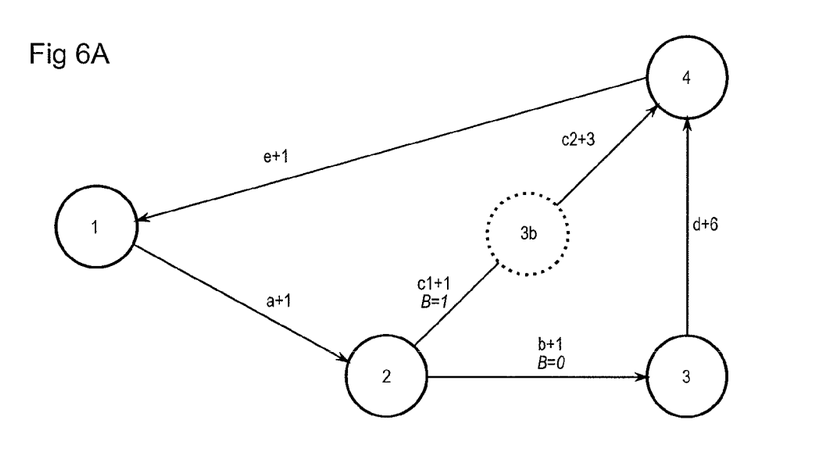
FIGS. 6A to 6C show transformations of the graph of FIG. 4 for a second alternative of time constraints.
Figure 6B:
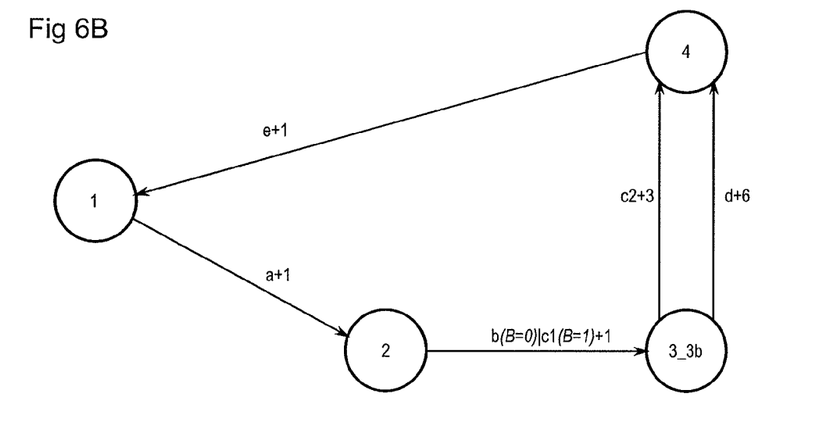
Figure 6C:
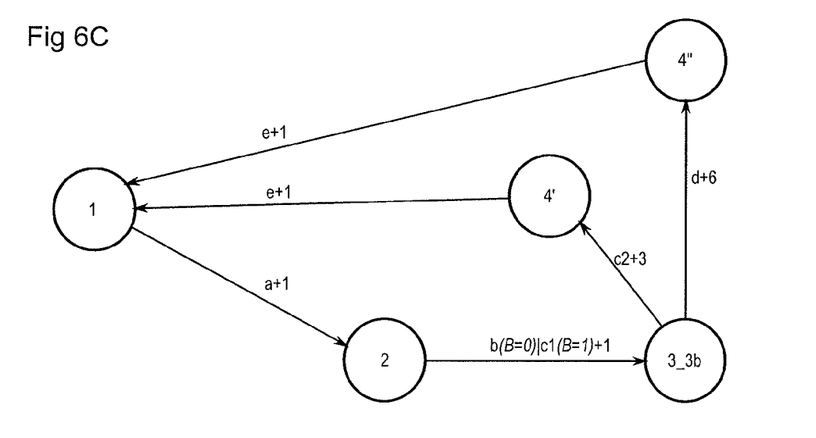

FIGS. 6A-6C illustrate transformation steps of the graph of FIG. 4 for a different value of the time constraint of the process d, here +6 instead of +3.

FIG. 6A corresponds to the step of FIG. 5A. The only difference is the value of the time constraint of the process d.

In FIG. 6B, the nodes 3 and 3*b* have been merged. Nodes 3_3*b* and 4 are connected by two arcs c2+3 and d+6 having different time constraints.

In FIG. 6C, the node 4 is split into two nodes, one, 4', forming the target of process c2+3 and the other, 4", forming the target of process d+6. Each of the nodes 4' and 4" is connected to node 1 by a process e+1.

From this step, the procedure of the step of FIG. 6A or 5A is repeated, by inserting an intermediate node in the process having the longest time constraint, d+6, to create two alternative processes having the same time constraint, c2+3 and d1+3, and so on, to transform the graph into a cyclic graph or a graph terminated by a cyclic portion.

From an arbitrary graph, this method produces an execution template formed of a limited number of time slots of different durations, comprising a cyclic portion. To schedule several tasks in parallel, a dedicated tool will use the resource needs and slot durations contained in the templates to find combinations of templates that are executable in parallel, and therefore tasks that are executable in parallel. Thus, scheduling is reduced to matching templates (one per task) instead of matching sequences of processes (numerous per task).

To further simplify the system validation tests, it is desirable to have short execution templates with identical time slots.

Figure 7A:
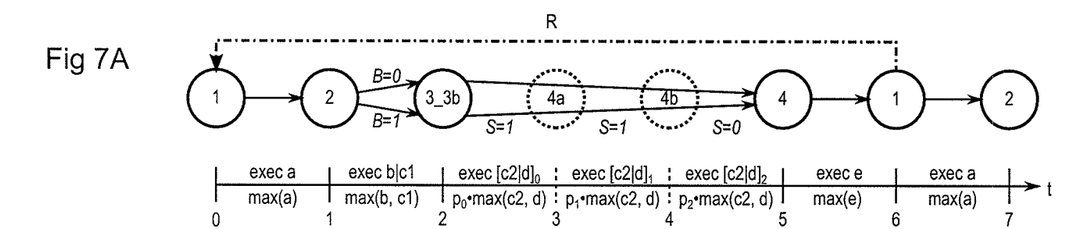
FIGS. 7A and 7B illustrate optimization steps for the execution template of FIG. 5C.
Figure 7B:
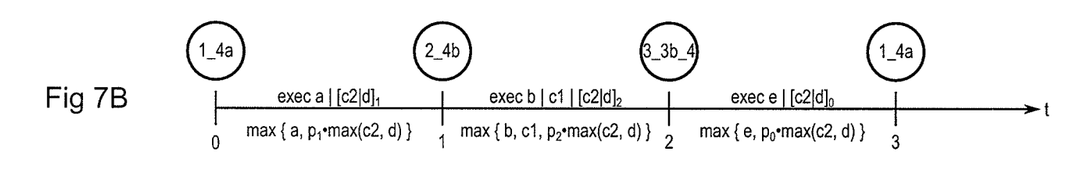

FIGS. 7A and 7B illustrate a methodology for normalizing the length of the time slots, and to shorten the templates.

FIG. 7A illustrates a processing step of the template of FIG. 5C, as an example. It is sought, in the cyclic portion of the template, to split the longer slots in several shorter slots whose length is the greatest common divisor of the slots of the cyclic portion. In the template of FIG. 7A, the slot between the nodes 3_3*b* and 4, of length 3, is split in three slots of length 1. This amounts to inserting intermediate transition nodes 4a and 4b in the arc c2|d of the graph.

The ambivalent process c2|d is thus split into three partial ambivalent processes [c2|d]0 to [c2|d]2 with the same time constraint 1. The initial resource need of process c2|d, max(c2,d), is distributed among the three partial processes with weights p0, p1 and p2, such that p0+p1+p2=1.

As for the intermediate node 3b of FIG. 5A, the intermediate nodes 4a and 4b become synchronization points from which the watchdog monitors the execution time of the processes. To avoid actually splitting the process c2|d, it is preferred to use a flag S that, like the flag B, indicates to the watchdog to omit reporting a fault if the process exceeds its resource need. The flag S is set unconditionally from the beginning of process c2|d (so basically from the beginning of any of the processes c and d), and then cleared at the last intermediate synchronization point (4b).

This technique thus normalizes the durations of the time slots, which is a first improvement to simplify the validation tests.

FIG. 7B illustrates a step for shortening the normalized execution template of FIG. 7A. The second half of the template has been overlapped on the first half, so that the nodes 4a, 4b and 4 respectively merge with the nodes 1, 2 and 3_3b. Thus only three time slots of duration 1 remain. In the first time slot, any of the processes a and [c2|d]1 may be executed, so in fact any of the processes a, c and d when using the flags B and S. In the second time slot, any of the processes b, c1, and [c2|d]2 may be executed, so in fact any of the processes b, c and d. In the last time slot, any of the processes e and [c2|d]0 may be executed, so in fact any of the processes e, c and d.

The resource needs for these slots follow the same determination rules as for the alternative processes. They are respectively equal to max {a, p1·max(c2,d)}, max{b, c1, p2·max(c2,d)}, and max {e, p0·max(c2,d)}.

For the considered exemplary template, which is fully cyclical with an even number of slots, the size of the template may be halved. In an arbitrary situation, the template includes a linear portion followed by a cyclical portion (FIGS. 3B, 3C) that may include an odd number of slots. The overlapping method applies to the normalized cyclic portion. It is applicable even if the normalized cyclic portion has an odd number of slots—indeed the overlap may be partial, which slightly sacrifices the size reduction of the template.

What is claimed is:

1. A method of offline scheduling processes of a task conforming to a flexible model for a real-time multitasking system, using a toolchain for compiling source code defining the task, the source code: (i) defining the task as sequences of processes with branch points, at each of which an execution of one or the other of two alternative processes is decided at run time on the real-time multitasking system, and (ii) defining for each process a hardware resource need and a time constraint that need to be satisfied at run time on the real-time multitasking system, the method comprising the following steps:
   a) parsing the source code for branch points;
   b) defining for the two alternative processes of each branch point a common time slot based on the time constraints of the alternative processes;
   c) assigning to the common time slot a resource need equal to the larger of the resource needs of the two alternative processes; and
   d) producing static scheduling parameters for the real-time multitasking system from the resulting time slots and corresponding resource needs, wherein:
      a common time slot defined for two alternative processes configures a time base of the real-time multitasking system for executing inside the common time slot any of the two alternative processes decided at run time, and
      a corresponding resource need configures a watchdog of the real-time multitasking system for monitoring compliance with the resource need by the alternative process executed inside the common time slot.

2. The method of claim 1, wherein
the source code defines the task in a form of a graph where the processes are connected by transition nodes, and each transition node defines a synchronization point in the time base of the real-time multitasking system, and the method further comprises the steps of:
   defining limits of a time slot of a process from a source transition node and a destination transition node of the process;
   for two alternative processes that have a common source node and two respective target nodes, merging the two target nodes into a merged target node; and
   defining the time slot common to both alternative processes from the common source node and the merged target node.

3. The method according to claim 2, further comprising the following steps:
   when two alternative processes have different time constraints, creating an intermediate transition node in the alternative process having a longer time constraint, resulting in a first partial alternative process between the source node and the intermediate node, and a second partial process between the intermediate node and the target node of the alternative process having the longer time constraint;
   assigning to the first partial alternative process a first resource need and a time constraint equal to the time constraint of the alternative process having the shorter time constraint;
   assigning to the second partial process a second resource need such that the sum of the first and second resource needs is equal to the resource need of the alternative process having the longer time constraint, and a time constraint equal to the difference of the time constraints of the two alternative processes; and
   proceeding with the first partial alternative process and the alternative process having the shorter time constraint according to step b).

4. A method of executing a task that is scheduled according to claim 3, comprising the following step executed in the multitasking system:
   omitting to signal a fault by the watchdog if the execution of the ongoing process exceeds the resource need and the ongoing process is the first partial alternative process.

5. The method of claim 4, further comprising the steps of:
   setting a state variable upon execution of the first partial alternative process;
   omitting to signal a fault by the watchdog if the execution of the ongoing process exceeds the resource need and the state variable is set; and
   clearing the state variable at a synchronization point corresponding to a merged target node.

6. The method according to claim 3, further comprising the following steps for a cyclic portion of the graph:

dividing each process having a longer time constraint in a set of partial processes each having a shorter time constraint that is the greatest common divisor of the time constraints in the cyclic portion, whereby the cyclic portion of the graph is transformed into a normalized sub-graph defining a sequence of full or partial processes all having the same normalized time constraint; and distributing the resource need of each process having a longer time constraint between the corresponding partial processes, whereby the sum of the resource needs of the partial processes is equal to the resource need of the process having the longer time constraint.

7. The method of claim 6, further comprising the steps of:

overlapping the end of a first portion of the sub-graph over the beginning of a second portion of the sub-graph, so that the transition nodes of the end of the first portion of the sub-graph coincide with respective nodes of the beginning of the second portion of the sub-graph, whereby two consecutive pairs of coincident nodes define a time slot common to the processes having as respective origins the two nodes of the first pair; and assigning to the common time slot thus defined a resource need equal to the greatest of the resource needs of the processes associated with the first pair of nodes, and a time constraint equal to the normalized time constraint.

8. A method of offline scheduling processes that form a task conforming to a flexible model for a real-time multitasking system, using a toolchain for compiling source code defining the task, the source code: (i) representing the task in a form of a graph defining a group of processes connected by transition nodes, where each transition node defines a synchronization point according to a time base during execution of the task on the real-time multitasking system, and (ii) defining for each process a hardware resource need and a time constraint, the method comprising the steps of:

a) identifying each branch transition node at which an execution of one or the other of two alternative processes is decided at run time, whereby the two alternative processes have the branch transition node as a common source transition node and two respective target transition nodes;

b) creating an intermediate transition node in the alternative process having a longer time constraint, resulting in a first partial alternative process between the common source transition node and the intermediate transition node, and a second partial process between the intermediate transition node and the target transition node of the alternative process having the longer time constraint;

c) assigning to the first partial alternative process a first resource need and a time constraint equal to the time constraint of the alternative process having the shorter time constraint;

d) assigning to the second partial process a second resource need such that the sum of the first and second resource needs is equal to the resource need of the alternative process having the longer time constraint, and a time constraint equal to the difference of the time constraints of the two alternative processes;

e) merging the target transition node of the alternative process having the shorter time constraint with the intermediate transition node, resulting in a merged target node;

f) defining for the first partial alternative process and the alternative process having the shorter time constraint a common time slot extending between the common source transition node and the merged target transition node;

g) assigning to the common time slot a resource need equal to the larger of the resource needs of the two alternative processes; and h) producing static scheduling parameters for the multitasking system based on the resulting time slots and corresponding resource needs.

9. The method of executing a task scheduled according to claim 8, further comprising the following steps executed in the multitasking system:

in each time slot, checking by a watchdog that the execution of an ongoing process complies with the resource need assigned to the time slot; and omitting to signal a fault by the watchdog if the execution of the ongoing process exceeds the resource need and the ongoing process is a first partial alternative process.

10. The method of claim 9, further comprising the steps of:

setting a state variable upon execution of the first partial alternative process;

omitting to signal a fault by the watchdog if the execution of the ongoing process exceeds the resource need and the state variable is set; and clearing the state variable at a synchronization point corresponding to a merged target node.

11. The method of claim 8, further comprising the following steps for a cyclic portion of the graph:

dividing each process having a longer time constraint in a set of partial processes each having a shorter time constraint that is the greatest common divisor of the time constraints in the cyclic portion, whereby the cyclic portion of the graph is transformed into a normalized sub-graph defining a sequence of full or partial processes all having the same normalized time constraint; and distributing the resource need of each process having a longer time constraint between the corresponding partial processes, whereby the sum of the resource needs of the partial processes is equal to the resource need of the process having the longer time constraint.

12. The method of claim 11, further comprising the steps of:

overlapping the end of a first portion of the sub-graph over the beginning of a second portion of the sub-graph, so that the transition nodes of the end of the first portion of the sub-graph coincide with respective nodes of the beginning of the second portion of the sub-graph, whereby two consecutive pairs of coincident nodes define a time slot common to the processes having as respective origins the two nodes of the first pair; and assigning to the common time slot thus defined a resource need equal to the greatest of the resource needs of the processes associated with the first pair of nodes, and a time constraint equal to the normalized time constraint.

* * * * *